Figure 1:
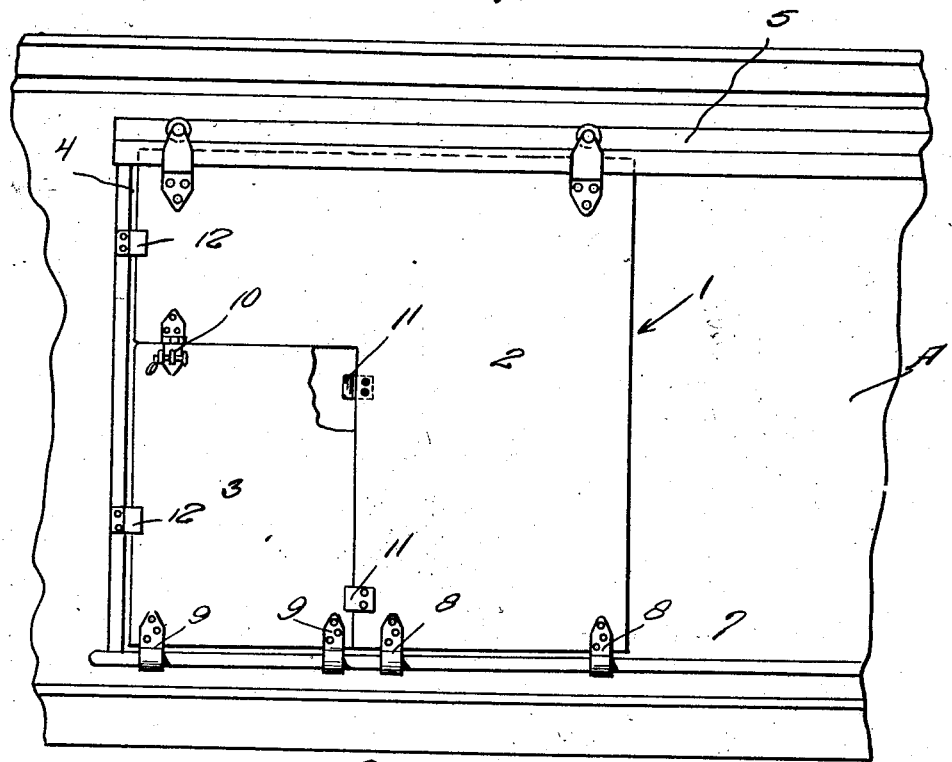

May 4, 1926.

A. L. CASEY

CAR DOOR

Filed April 4, 1925

1,583,443

Inventor
A. L. Casey,
By
Attorney

Patented May 4, 1926.

1,583,443

UNITED STATES PATENT OFFICE.

ARTHUR L. CASEY, OF VICKSBURG, MISSISSIPPI.

CAR DOOR.

Application filed April 4, 1925. Serial No. 20,693.

*To all whom it may concern:*

Be it known that I, ARTHUR L. CASEY, a citizen of the United States, residing at Vicksburg, in the county of Warren and State of Mississippi, have invented certain new and useful Improvements in Car Doors, of which the following is a specification.

This invention relates to improvements in car doors and more particularly to a vertically sliding door for stock or freight cars.

One of the important objects of the present invention is to provide a car door, wherein means is provided whereby a portion of the door may be used as a skid for unloading freight or stock from the car to a platform or the like.

A further object of the invention is to provide a vertically sliding car door of the above mentioned character, which includes main and auxiliary sections, means being provided for securing the sections together, so that the same are disposed for simultaneous sliding movement, in order to move the door to an open position.

A still further object of the invention is to provide a car door of the above mentioned character, which is simple in construction.

Other objects and advantages of the invention will become apparent during the course of the following detailed description.

Figure 2:
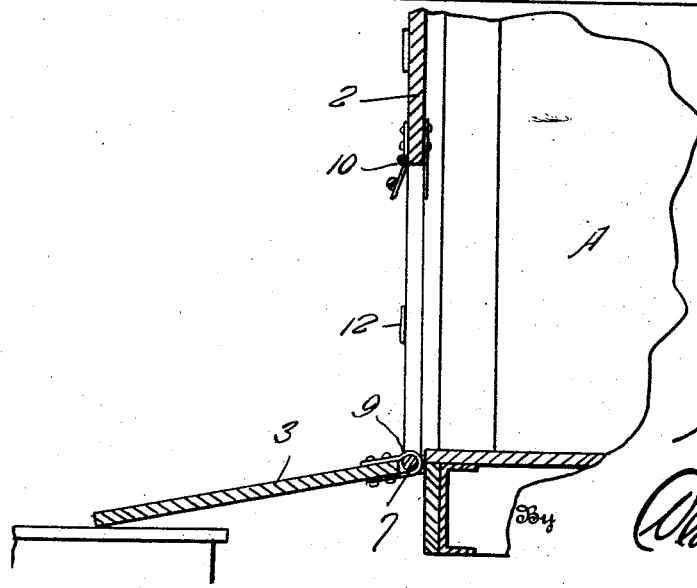

In the accompanying drawings, forming a part of this specification, and in which like reference characters indicate corresponding parts throughout the several views:

Figure 1 is a front elevation of the vertically sliding car door embodying my invention, showing the same mounted on the side of a freight car and disposed in a closed position, and Figure 2 is a fragmentary sectional view through the door, showing the auxiliary section in a downwardly swung position for use as a skid.

In the drawing, wherein for the purpose of illustration is shown the preferred embodiment of my invention, the numeral 1 designates generally the car door embodying my invention, the same including the main and auxiliary sections 2 and 3 respectively. The auxiliary section 3 is arranged in the lower forward corner of the main section, the latter being cut away, as more clearly illustrated in Figure 1, to accommodate the auxiliary section.

Extending across the top of the door opening 4, on the outer side of the car A is the truck 5, and cooperating therewith are the rollers 6, the latter being carried by the upper portion of the main section 2 of the car door, in the manner as also clearly illustrated in Figure 1. A track in the form of an elongated rod or bar 7 extends across the bottom of the door opening 4. The main section 2 is provided at its lower edge with the eye or strap member 8, the same being adapted for slidable movement on the rod 7. A similar pair of eye or strap members 9 are associated with the lower edge of the auxiliary section 3 and are also adapted for slidable movement on the rod 7. The construction, above set forth, enables the door 1 to slide vertically on the outer side of the car, so as to cover or uncover the door opening 4.

The auxiliary section 3 is held in a locked position with respect to the main section 2, so as to be disposed in the same vertical plane therewith, by means of the lock 10. A pair of guide ears 11 are secured to the main section 2 and extend forwardly from the vertical side edge of the cut away portion formed in the main section to accommodate the auxiliary section. The guide ears 11 cooperate to receive the rear side edge of the auxiliary section, when the latter is in its locked position with respect to the main section of the door.

The usual cleats or stop elements 12 are secured on the forward side edge of the door opening, and it is also to be understood that the usual lock is provided, for securing the door in a closed position.

The use of my improved car door may be briefly stated as follows: The door may be moved to an open position, by sliding the same rearwardly along the upper truck 5 and the rod 7, both sections of the door moving simultaneously. Whenever it becomes necessary to use a skid for loading or unloading freight or stock from the car A to a platform or another car, the lock 10 may be unfastened, so as to permit the forward sliding movement of the auxiliary section 3, so that the same will become disengaged from the guide ear 11 and the eye or strap member 11 will cooperate with the rod 7, in forming a hinge connection between the auxiliary section and the car, so that the auxiliary section may be swung downwardly to the position as shown more clearly in Figure 2, whereby the upper free end portion of the auxiliary section will rest on the loading platform, thus forming a skid which will, at all times, be supported in a proper position and against accidental displacement, so that any possibility of injury being sustained by the stock being handled will be prevented. Furthermore there will be no danger of the freight causing the displacement of the skid from its proper position while being transferred from the car to the loading platform.

While I have shown the preferred embodiment of my invention it is to be understood that various changes in the size, shape and arrangement of parts may be resorted to, without departing from the spirit of the invention or the scope of the appended claims.

Having thus described my invention, what I claim is:

1. A vertically sliding car door comprising main and auxiliary sections, the main section being cut away in its lower portion to accommodate the auxiliary section, means for securing said sections together, whereby the same are adapted for simultaneous sliding movement, a track extending across the top of the door opening of the car, rollers carried by the upper portion of the main section cooperating with said track, a bar extending across the bottom of the door opening, and eye members secured to the lower edges of the sections adapted for slidable movement on said rod, the eye member of the auxiliary section cooperating with the rod to permit the downward swinging movement of the auxiliary section, when the same is detached from the main section whereby a skid is provided.

2. A vertically sliding door comprising main and auxiliary sections, the main section being cut away in its lower portion to accommodate the auxiliary section, guide cleats extending from the vertical edge of the opening formed in the main section and cooperating with the adjacent vertical edge of the auxiliary section for holding the vertical section in the main section in vertical alinement, means for securing the auxiliary sections to the main section, said sections adapted for simultaneous sliding movement, a strap extending across the top of the door opening of the car, rollers carried by the upper portions of the main section cooperating with the strap, a rod extending across the bottom of the door opening, eye member secured to the lower edges of the sections and adapted for slidable movement on said rod, the eye members of the auxiliary sections cooperating with the rod to permit the downward swinging movement of the auxiliary sections when the securing means is open and the cleats are disengaged above the auxiliary sections whereby said auxiliary sections provide a skid.

In testimony whereof I affix my signature.

ARTHUR L. CASEY.